Figure 1:
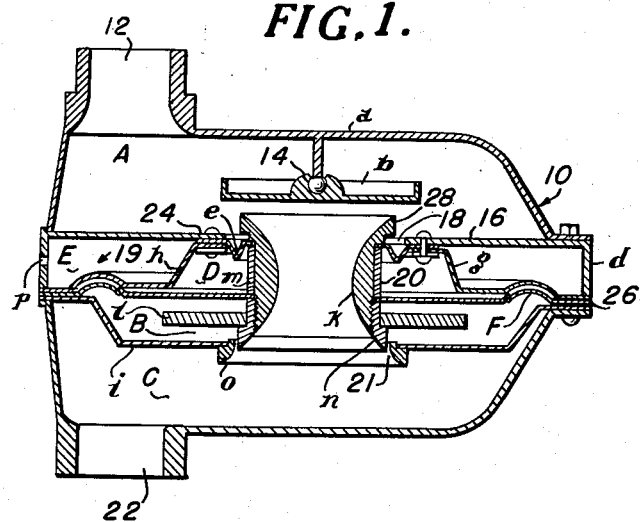

March 16, 1954  K. H. SCHWARZ  2,671,989
MEMBRANE FLUID PRESSURE REGULATOR
Filed July 27, 1951

INVENTOR
KARL HERMANN SCHWARZ

BY *Cushman, Darby & Cushman*
ATTORNEY

Patented Mar. 16, 1954

2,671,989

UNITED STATES PATENT OFFICE 2,671,989

MEMBRANE FLUID PRESSURE REGULATOR

Karl Hermann Schwarz, Osnabruck, Germany, assignor to G. Kromschroder Aktiengesellschaft, Osnabruck, Germany Application July 27, 1951, Serial No. 238,878

Claims priority, application Germany August 4, 1950

7 Claims. (Cl. 50—20)

The present invention relates to fluid pressure regulators and, more particularly, to fluid pressure regulators of the flexible diaphragm or membrane type having a hollow movable valve member through which the fluid flows.

The purpose of fluid pressure regulators of this type is to control the back pressure therein in order that an even pressure of gas or fluid is maintained when the consumer demands a supply. In the past, a particular disadvantage of this type of regulators has been a comparatively high inner pressure drop which caused bad regulation effects (low efficiency with certain back pressures required or too low back pressures with certain output required) when the inlet pressures are low.

Therefore, an object of the present invention is the provision of a fluid pressure regulator which will obtain the maximum efficiency when inlet pressures are low. By providing the movable element of the valve with a mounting so that it floats freely with respect to the valve plate on which it seats without special guiding means, the friction caused by special guides or the like is eliminated and, thus, the regulator is immediately responsive to changes in inlet pressure or consumer's supply demand.

A further object of the present invention is to provide a regulator with a pivotal valve seat for cooperating with the freely floating valve body. The provision of a pivotal valve seat insures closing of the valve when the valve body is askew with respect to the valve seat. Thus, there will be no pressure rise toward the zero cubic meter per hour consumption and the flow of fluid through the meter will remain smooth and undisturbed even at low inlet pressures.

A still further object of the present invention is to provide a fluid pressure regulator wherein the passage of fluid through the regulator may be regulated in a perpendicular direction, as is often desired.

Still another object of the present invention is the provision of a fluid regulator with a movable hollow valve member in which is constructed a Venturi nozzle.

Another object of the present invention is the provision of a fluid pressure regulator with a valve plate mounted above the movable hollow valve member. By having the valve plate mounted above the valve member, dust and foreign particles will not accumulate or settle on the valve plate and, thus, will not disturb the closing of the valve or reduce the efficiency of the regulator at near zero consumption of the fluid.

A still further object of the invention is the provision of a fluid pressure regulator having a safety membrane or diaphragm mounted in the working section of the regulator which will provide an indication when either the working or compensating membrane is ruptured.

Figure 6:
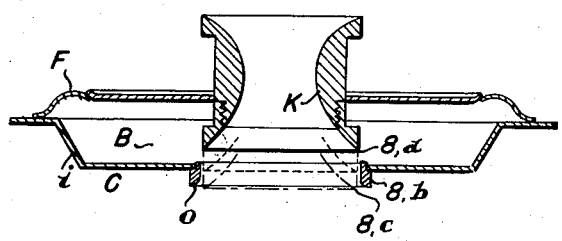
Figure 4:
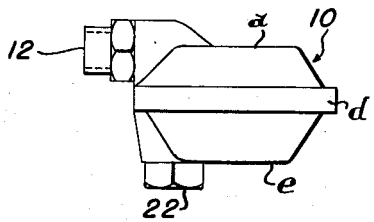
Figure 5:
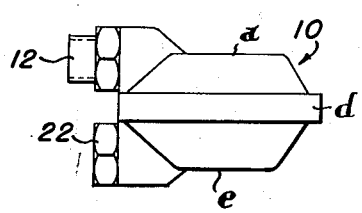

These and other objects of the invention will appear more clearly in the following specification, claims and drawings in which:

Figure 1 is a cross-sectional elevational view of the regulator of the present invention;

Figures 2 through 5 disclose various inlet and outlet connections for the regulator of the present invention, and Figure 6 is a detail view of the movable valve member, working membrane, and wall adjacent the discharge end of the valve member.

Referring specifically to the drawings wherein like reference numerals or characters represent like or similar parts, the fluid pressure regulator of the present invention is provided with a casing generally indicated 10. The casing 10 is comprised of three sections which are detachably connected to each other. The upper section a is provided with an inlet 12 for the gas or fluid and also supports a pivotal valve plate b. As is clearly shown in Figure 1 of the drawings, valve plate b may be universally pivoted on a ball joint or the like as indicated at 14. The middle section d of casing 10 has an inwardly extending wall 16 having an apertured center 18 of sufficient size to permit a movable valve member 20 to extend therethrough. A working membrane f, safety membrane g and compensating membrane e are all carried in the middle section d of valve casing 10 as will be subsequently described in more detail. Attached to the middle working section d is a lower section c having an outlet 22 therein through which the fluid such as gas is supplied to the consumer.

Valve member 20 is supported for free floating movement by compensating membrane e and working membrane f. The outer end of compensating membrane e is connected to the inner edge of wall 16 in any suitable manner as shown at 24. The outer peripheral edge of working membrane f is attached in any suitable manner between the middle working section d and the lower section c of the casing as indicated at 26. Valve member 20 is provided with an annular spacing ring m which will properly locate the clearance distance between compensating membrane e and working membrane f. Compensating membrane e and working membrane f are connected to valve member 20 by means of a nut n on the lower end of the valve body. A suitable weight l is also attached to the valve member 20 so that a predetermined back pressure in the regulator may be maintained.

Provided between the middle working section d and the lower section c of casing 10 is an inwardly extending rigid wall i having an aperture 21 therein of slightly larger diameter than the movable valve member 20. Mounted on the inner edge of wall i is a collar or flange o which is positioned adjacent the discharge end of valve member 20. As is now evident, the wall i and the working membrane f define a chamber B which is in open communication with the flow of fluid through the regulator.

Valve member 20 is annular and hollow and is provided with a Venturi nozzle k. The upper edge of valve body 20 is provided with a lip or projection 28 which will cooperate with compensating membrane e as will be explained later in the specification. The lower or discharge end of valve member 20, as previously stated, terminates adjacent collar o of the rigid wall i and will be either below or above the collar o depending upon the operating conditions to which the fluid regulator is subjected.

Since both the compensating and working membranes are connected to the valve member 20 and casing 10 and since they are spaced from each other, they define a chamber 19 which is closed to the flow of fluid through the regulator. An orifice or breather nozzle p is provided in the wall of the middle or working section d so that movement of valve member 20 will not be impeded by a change of volume in chamber 19. In other words, if valve member 20 is moved away from the valve plate b, the sub-atmospheric pressure created in chamber 19 will be relieved.

Chamber 19 is provided with a safety membrane g which is connected to the casing 10 at 24 and 26. An orifice or vent nozzle h is provided in safety membrane g so that should either of the membranes e or f rupture, gas would leak from the chamber D through the orifice into chamber E and from there into atmosphere through the orifice p. This will give the consumer an indication of failure within the regulator without endangering human life.

The fluid pressure regulator of the present invention will operate in the following manner:

Gas will enter inlet 12 into the space A of upper section a of casing 10 and will pass between the valve plate b and nozzle k. Depending upon operating conditions, the position of the valve nozzle k with respect to valve plate b will be determined by the pressure in the space or chamber B between the rigid wall i and the working membrane f. Gas after passing through valve nozzle k will enter the space C below the rigid wall i and into chamber C of the lower section c of casing 10. It will then be discharged through the outlet 22 to the consumer upon demand.

Variations in inlet pressure are compensated for by the compensating membrane e and the projecting or lip 28 on valve member 20. In other words, if there is an increase in inlet pressure, the tendency of the compensating membrane e is to open valve member 20 with respect to valve plate b. However, the overhanging lip counter-balances this tendency of the valve to open and, thus, there will be no throttling of the valve member 20.

The working membrane f maintains the back pressure of the regulator substantially constant so that the consumer will obtain a constant pressure for the supply demanded. In other words, if there is an increase in inlet pressure, there will be an increase in pressure in the chamber B between the wall i and the working membrane f and, thus, the valve will close as shown at 8a in Figure 6. If there is a decrease in inlet pressure, the Venturi nozzle k will cause a sub-atmospheric condition to be created in chamber B so that the valve body 20 will move away from valve plate b as is shown at 8e of Figure 6 and, thus, the supply of the consumer is not affected.

It is also true that if the consumer increases the gas consumption, the gas flowing through the regulator will cause a sub-atmospheric condition in chamber B under the working diaphragm and, thereby, causing the valve member 20 to open with respect to valve plate b allowing a greater quantity of gas to flow through the fluid regulator. Should the consumer decrease the output of gas, a pressure will build up in chamber B and the valve member 20 will close decreasing the amount of gas flowing through the regulator.

In order that valve body 20 will operate at a particular back pressure, the proper weight l is attached thereto. The weight l can be changed for various operating conditions.

Figure 2:
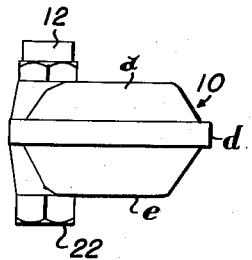
Figure 3:
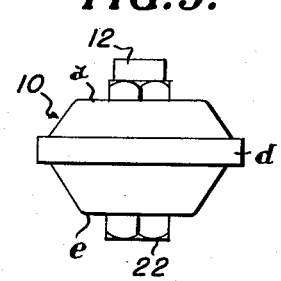

With a regulator of the present invention, wherein the valve plate b is pivotable, various modifications of casing structure are possible. Figures 2 through 5 inclusive disclose external configurations of the casings showing different positions for the inlet and discharge connections. Figures 2 and 3 disclose regulators where the flow into is substantially in line with the flow out of the regulator. On the other hand, Figure 4 discloses the inlet connection normal to the outlet connector, while Figure 5 discloses the inlet connection at approximately 180° to the outlet connection.

As previously mentioned, a safety membrane is attached to the casing as at 26 and to the wall 16 as at 24. Thus, the safety membrane forms the chamber D between the compensating membrane e and the working membrane f. Breather nozzle or orifice p is provided in the middle working section d and an additional small orifice or vent nozzle h is provided in the safety membrane g. Should either the working membrane f or the compensating membrane e become ruptured, gas would enter the chamber E and escape through the vent nozzle g into the chamber E through the orifice out to atmosphere. The vent nozzle h is kept so small that the gas escaping serves only as an indicator of the damage to the regulator without being detrimental to the health of the consumer.

The terminology used in this specification is for the purpose of description and not for limitation as the scope of the invention is defined in the claims.

What I claim is:

1. A membrane pressure regulator for regulating pressure of a fluid in a system comprising: a casing having fluid inlet and outlet passages; a compensating membrane and a working membrane carried by said casing and defining a chamber closed to the fluid passing through said regulator; a valve plate connected to said casing; a hollow valve member, including a valve seat and a Venturi nozzle, carried by said working and compensating membranes for free floating movement with respect to said valve plate; one end of the Venturi nozzle of said valve member protruding above said compensating member and having a circumferentially and radially extending projection thereon, and a wall carried by said casing and having an aperture therein of size slightly larger than the diameter of said valve member, the inner edge of said wall terminating adjacent the discharge end of said Venturi nozzle of said valve member, said wall dividing the space on the outlet side of said working membrane into two chambers, the chamber between said working membrane and said wall being in substantially open communication with the fluid passing through said regulator, and said valve member being movable through the aperture in said wall.

2. A membrane pressure regulator of the type described in claim 1 wherein said valve plate is pivotally connected to said casing.

3. A membrane pressure regulator of the type described in claim 1 including means associated with said valve member for adjusting the distance between said compensating membrane and said working membrane; and means for weighting said valve member.

4. A membrane pressure regulator of the type described in claim 1 wherein said first named chamber is provided with a breather nozzle.

5. A membrane pressure regulator of the type described in claim 4 including a safety membrane mounted in said first named chamber between the outer edge of said compensating membrane and the outer edge of said working membrane, said safety membrane including a vent therein.

6. A membrane pressure regulator for regulating pressure of a fluid in a system comprising: a casing having upper, middle and lower sections and detachably connected to each other respectively; the upper section of said casing having a fluid inlet passage and the lower section of said casing having a fluid outlet passage; a valve plate connected to the upper section of said casing; a compensating membrane and a working membrane carried by the middle section of said casing and defining a chamber closed to the fluid passing through said regulator; a hollow valve member including a valve seat and a Venturi nozzle carried by said compensating and working membranes for free floating movement with respect to said valve plate, one end of the Venturi nozzle of said valve member protruding above said compensating membrane; and a rigid wall dividing the lower and middle sections of said casing and having an aperture therein of size slightly larger than the diameter of said valve member, said wall having its aperture positioned adjacent the discharge end of said Venturi nozzle, said wall and said working membrane defining a second chamber in substantially open communication with the fluid passing through said regulator, and said valve member being movable with respect to said wall.

7. A membrane pressure regulator of the type described in claim 6 wherein said valve plate is pivotally connected to the upper section of said casing.

KARL HERMANN SCHWARZ.

References Cited in the file of this patent

UNITED STATES PATENTS

| Number | Name | Date |
|---|---|---|
| 973,609 | Abrams | Oct. 25, 1910 |
| 1,978,398 | Backer | Oct. 30, 1934 |

FOREIGN PATENTS

| Number | Country | Date |
|---|---|---|
| 676,833 | Germany | June 13, 1939 |
| 391,663 | Great Britain | May 6, 1933 |